June 4, 1929.    M. BASSION    1,715,492
FILTER
Filed Sept. 13, 1928    2 Sheets-Sheet 1

WITNESSES:
Gerhard Baule
W. T. Merrell

INVENTOR:
Morris Bassion,
BY
Joshua R. H. Potts
ATTORNEY.

June 4, 1929.  M. BASSION  1,715,492
FILTER
Filed Sept. 13, 1928  2 Sheets-Sheet 2

WITNESSES:
Gerhard Banle

INVENTOR:
Morris Bassion,
BY Joshua R. H. Potts
ATTORNEY.

Patented June 4, 1929.

1,715,492

UNITED STATES PATENT OFFICE.

MORRIS BASSION, OF PHILADELPHIA, PENNSYLVANIA.

FILTER.

Application filed September 13, 1928. Serial No. 305,723.

My invention relates to filters and more particularly to filters for the cooling systems of internal combustion engines.

The object of the invention is to provide a filter which will arrest the movement of foreign matter in circulating water and collect it in a receptacle from which it may be easily removed.

Figure 1:
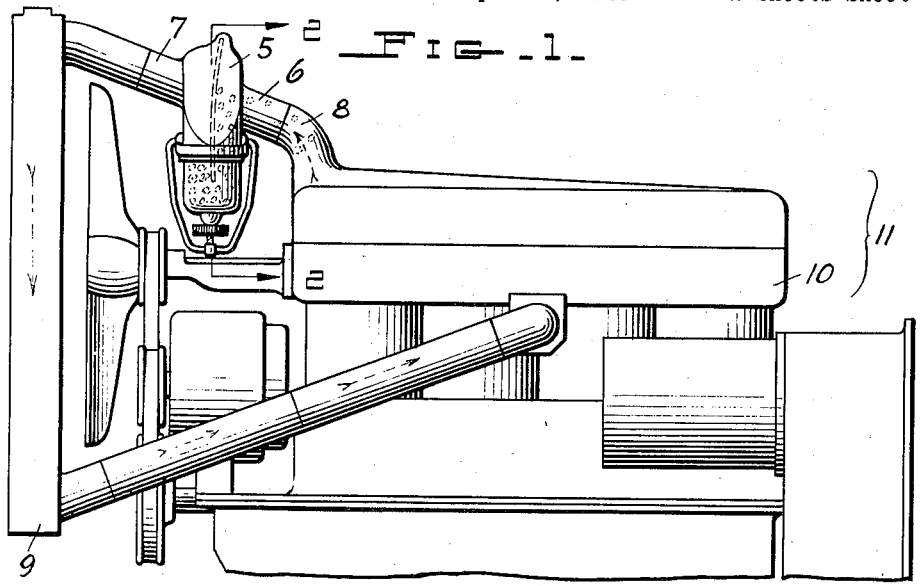
Figure 2:
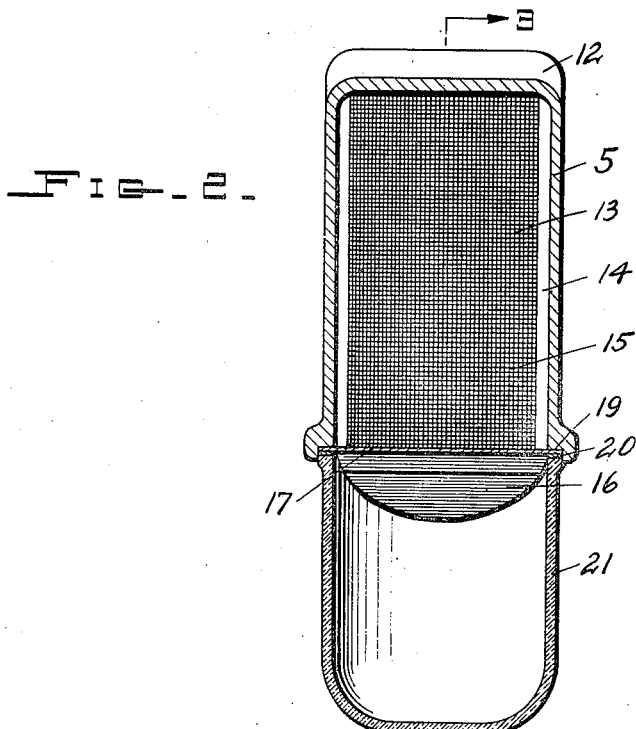
Figure 3:
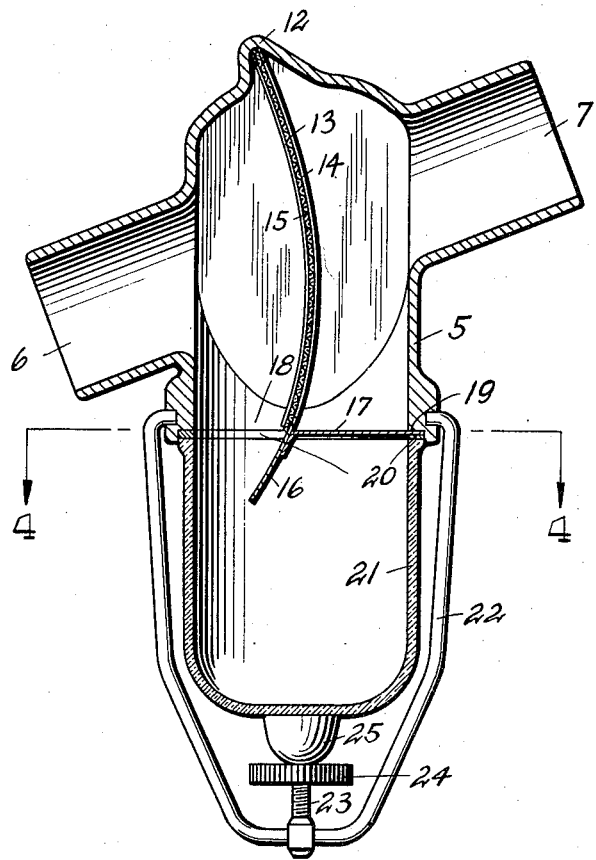
Figure 4:
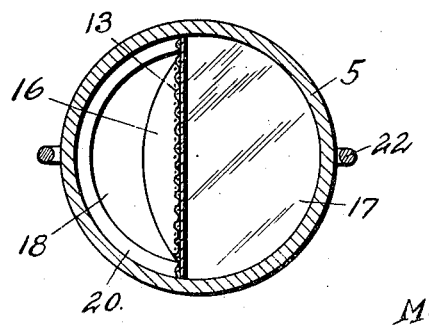

The invention resides in a filter adapted to be installed in the inlet or outlet of the water jacket of an internal combustion engine, for removing foreign matter from the water, and provided with a sediment chamber in which such foreign matter is trapped, as illustrated by the embodiment shown in the accompanying drawings, in which Figure 1 is a fragmentary side view of an internal combustion engine having one of my filters installed in the outlet from its water jacket, Figure 2 an enlarged vertical section through the filter, taken on line 2—2 on Figure 1, Figure 3 a central vertical section taken at right angles to the plane of Figure 2, as indicated by line 3—3 on that figure, and Figure 4 a sectional plan taken on line 4—4 on Figure 3.

Referring to the drawings, the filter has a filter chamber 5 provided with an inlet 6 and an outlet 7 for connection into the conduit 8 through which water flows into the radiator 9 from the water jacket 10 of an internal combustion engine 11, which is shown for illustrative purposes only and will not be described as my filter may be installed in the cooling system of almost any type of internal combustion engine.

The body part of the filter chamber is substantially rectangular in cross-section and has a recess 12 formed in its top wall to receive the upper end of a strainer 13 which has a rectangular frame 14 for supporting a foraminous panel 15 made of wire mesh or the like. Frame 14 has a baffle 16, depending from its lower end and preferably formed integral therewith, and a partition 17 extending from one side for closing a part of a preferably circular opening 18 formed in the bottom of the filter chamber and surrounded by a shoulder 19. An annular gasket 20 abuts the underside of partition 17 and that part of shoulder 19 not covered by partition 17. The rim of a sediment chamber 21 is forced against the gasket by a clamp consisting of a bail 22 swingably mounted in the lower end of the filter chamber and having a screw 23 fixed at its center upon which a thumb wheel 24 is threaded and adapted to force an abutment 25 against the bottom of the sediment chamber; partition 17 being embedded in the gasket by the pressure exerted by the thumb wheel.

When an internal combustion engine is in operation, water flows from the bottom of the radiator into the water jacket and from the water jacket into the top of the radiator, as indicated by the dotted arrows in Figure 1. Foreign matter carried by the water, such as the foreign matter indicated by dotted globules in Figure 1, has its further progress arrested by the strainer. If the foreign matter is heavy, it falls into the sediment chamber of its own weight while, if lighter than water, it is gradually washed downwardly into the sediment chamber by the movement of the water.

Partition 17 preferably covers a little more than one half of opening 18 and baffle 16 preferably curves against the direction of the current so that an eddy current is set up in the unclosed part of opening 18 which tends to precipitate finely divided matter, such as rust particles and the like. Material precipitated or trapped in the sediment chamber cannot reenter the circulatory system due to the position of partition 17 which also prevents any circulation of water through the sediment chamber. The sediment chamber may be removed and emptied as occasion requires by loosening thumb wheel 24 and swinging bail 22 to one side.

While I have illustrated and described one embodiment of my invention and shown it installed in the outlet of an internal combustion engine, it will be understood that modifications may be made and the filter adapted to other situations without departing from the spirit thereof and, hence, I do not wish to limit myself to the precise construction set forth but consider that I am at liberty to make such changes, alterations and applications as fairly come within the scope of the appended claims.

I claim:—

1. A filter including a filter chamber having an opposed inlet and outlet; a sediment chamber detachably connected with the lower end of the filter chamber; a screen extending from top to bottom of the filter chamber; a partition extending from the bottom of the screen to the wall of the outlet side of the filter chamber, and a baffle extending from the lower end of the screen into the sediment chamber.

2. A filter including a filter chamber having an opposed inlet and outlet; a sediment chamber detachably connected with the lower end of the filter chamber; an arcuate screen extending from top to bottom of the filter chamber; a partition extending from the bottom of the screen to the wall of the outlet side of the filter chamber, and a baffle extending from the lower end of the screen into the sediment chamber.

In testimony whereof I have signed my name to this specification.

MORRIS BASSION.